United States Patent [19]

Wortham et al.

[11] 4,034,120
[45] July 5, 1977

[54] PELLETING AID FOR AGRICULTURAL PRODUCTS

[75] Inventors: Joseph Sidney Wortham, Brownsville; Ernest Carlisle Johnson, Memphis, both of Tenn.

[73] Assignee: W. R. Grace & Co., Cambridge, Mass.

[22] Filed: Oct. 28, 1975

[21] Appl. No.: 626,569

[52] U.S. Cl. .............................. 426/531; 426/283; 426/635; 71/24; 71/64 G
[51] Int. Cl.² ...................................... A23K 1/175
[58] Field of Search ............... 71/5, 23, 24, 64 B, 71/64 E, 64 F, 64 G; 426/74, 97, 516, 601, 805, 807, 283, 635, 531

[56] References Cited

UNITED STATES PATENTS

| | | | |
|---|---|---|---|
| 1,972,390 | 11/1931 | Miner | 71/64 G |
| 1,991,242 | 2/1935 | Cole | 71/23 |
| 2,341,800 | 2/1944 | Martin et al. | 71/1 |
| 2,369,097 | 2/1945 | Wilkins | 71/64 G |
| 3,035,920 | 5/1962 | Knodt | 426/74 |
| 3,077,395 | 2/1963 | Ridgeway | 71/64 G |
| 3,137,565 | 6/1964 | Hayes | 71/64 E |
| 3,155,521 | 11/1964 | Ward | 426/74 |
| 3,186,828 | 6/1965 | Baarson | 71/64 E |
| 3,284,209 | 11/1966 | Kelly | 426/74 |
| 3,369,884 | 2/1968 | Barron | 71/28 |
| 3,467,525 | 9/1969 | Hale | 426/805 |
| 3,560,190 | 3/1971 | Hughes | 71/5 |
| 3,686,134 | 8/1972 | Robinson | 71/64 G |
| 3,942,969 | 3/1976 | Carroll | 71/5 |

OTHER PUBLICATIONS

Hardesty and Kumagai, Agricultural Chemicals, Feb.--Mar. 1952, pp. 38, 38A, 38B, 38C, 38D, 39, 145, 117.

Primary Examiner—Thomas G. Wyse
Assistant Examiner—Ernest G. Therkorn
Attorney, Agent, or Firm—William L. Baker; C. E. Parker

[57] ABSTRACT

The pelleting of fibrous agricultural material, such as beet pulp is facilitated by the incorporation of a mixture of expanded vermiculite and/or finely divided vermiculite ore with an organic material which may be animal fat or a vegetable oil product such as cottonseed oil.

8 Claims, No Drawings

PELLETING AID FOR AGRICULTURAL PRODUCTS

THE PRIOR ART

Beet pulp, wheat screenings, cottonseed hulls and burrs, bagasse, whole corn plant, alfalfa, wheat straw and other straws, all constitute examples of high fiber agricultural refuse materials that have a low bulk density and are of low economic value. The pelleting of such materials improves their characteristics as animal feed, decreasing storage space requirements and results in more generally merchandisable products. The process of pelleting, as conventionally practiced, involves various combinations of such operations as chopping, drying, heating, steaming and extruding. The latter in particular is a slow process that has high power requirements, and high production costs.

Recourse has been had, in certain technologies to various additives which, when combined with substances to be tableted, pelleted or otherwise compacted, facilitate the process and are ultimately responsible for significant decreases in power consumption, remarkable increases in equipment capacity, or both. For instance, in the art of tableting chemicals such as inorganic fertilizers, U.S. Pat. No. 3,369,884 teaches that the incorporation of 25 to 50% of expanded vermiculite in the fertilizer mix provides lubrication for the tablet during manufacturing.

In the case of high fiber agricultural refuse materials however, the use of expanded vermiculite in proportions consistent with the physiological utility of these materials has not resulted in any improvement in the pelleting process. On the other hand, while it is known that the incorporation of some finely divided unexpanded vermiculite ore into such materials as beet pulp, may cause a significant improvement in the pelletizing process under some circumstances, the factors responsible for this inconsistent phenomenon have yet to be adequately explored.

SUMMARY OF THE INVENTION

It has now been discovered that the pelletization of high fiber agricultural refuse materials can be greatly facilitated by incorporating into said materials prior to pelletization, an additive mix containing as essential components a fatty substance of animal or vegetable origin and a particulate inorganic material which may be expanded vermiculite, unexpanded vermiculite ore fines, or a mixture of these two inorganic materials.

Excellent results are obtained in terms of reduction in power requirements or increase in equipment capacity when the components above listed are used in the permissible combinations in a ratio approximately 1:1:16 for the fatty substance, the expanded vermiculite and the ore, respectively, and when the resulting mixes are added to the high fiber material in quantities such as to yield an overall fatty material content preferably within the range of about 0.1 to 0.3% by weight.

DETAILED DESCRIPTION

The pelleting aid of this invention is an intimate mixture of a fatty substance with a finely divided inorganic carrier. This carrier may consist of either expanded vermiculite or finely divided unexpanded vermiculite grits, or still a mixture of both materials. When grits are present in the composition, they sometimes contribute directly and independently to the effectiveness of the mix as a pelleting aid, especially when their rock content is lower than say 10% by weight. Expanded vermiculite, on the other hand, has shown no such effect on the pelleting process when used at the levels considered desirable for incorporation into animal feeds.

The fatty substance required for the pelleting mix of the invention may consist of any edible or inedible animal fat such as lard, tallow from beef or mutton, and the like, or it may be a substance of vegetable origin with or without chemical modification. This latter category of substances includes corn oil, cottonseed oil and other common edible oils and their hydrogenated products as well. Availability and cost will ultimately dictate the selection of any particular substance for the preparation of a given pelleting additive mix. On such a basis, as well as because of excellent performance, inedible animal fat has proven to be one of the preferred components of the mixes of this invention.

The pelleting aid mixes may be prepared in a variety of manners. Thus, the fatty substance can be moderately heated, e.g., at 160° F or less, and blended into expanded vermiculite or ore grits until absorbed. Also, rather than employing pre-expanded ore, usable mixes may be obtained in the manner of U.S. Pat. No. 3,686,134, that is by adding heat treated unexpanded vermiculite ore to a strongly heated fatty substance, e.g., corn oil at 500° F, and stirring the mixture until the ore has expanded. The drained product may contain for instance, up to about 75% of absorbed oil. In the case where the mix is to contain both types of inorganic material, the fatty substance may be added to the expanded vermiculite first and that blend is then mixed into the appropriate quantity of ore grits. The products obtained are generally free-flowing dust-free powders which are easily incorporated into the high fiber agricultural material. In the case of blends not containing any expanded vermiculite, pelleting is advisable for later storage and handling.

The components of the mixes just described are preferably combined in proportions of 5:5:90 by weight for the fatty material, the expanded vermiculite and the grits, respectively. These preferred proportions apply equally to mixes containing vermiculite only, grits only, or both vermiculite and grits. The proportions may vary somewhat from the preferred level depending on factors such as the particular fatty material selected, the quality of the grits used, the method of preparation and the storage requirements of the additive mix, the nature and the state of the fibrous material to be pelleted, the properties and the composition desired in the pellets to be obtained and, above all, the desired influence on the pelleting process. These factors will also operate in the selection of the quantity of additive mix to be incorporated into the fibrous material.

In any circumstance, significantly beneficial results in terms of pelleting ease can be achieved with enough pelleting additive mix to provide a fatty material content of about 0.1 to 0.3% by weight of mixture to be pelleted. In terms of 16:1 grits and fatty substance mix, this level can be achieved by the incorporation of approximately 2 to 4% by weight of said mix into the fibrous agricultural material. The quantities of other mixes to be incorporated to achieve the fat level desired can readily be calculated from the ratio of fatty substance to inorganic material present in said mixes. Thus, a 90:5:5 grit-vermiculite-animal fat mix will need to be incorporated in slightly higher proportions, while a 1:1 vermiculite-animal fat mix will supply the level of fat needed at a much lower dosage. Obviously, it is conceivable to add the pelleting aid mix of this invention or its individual components in proportions exceeding those required for facilitation of pelleting, since these materials are known to possess further utility in animal feeding, either in terms of nutritive value or as beneficial roughage. These possibilities do not of course detract from their newly discovered cooperative utility in pelletization.

In addition to the components of the pelleting aid mixes that have just been discovered, other animal feed supplements and additives such as vitamins, antibiotics and the like, may also be incorporated into the mixes for later convenience in blending such supplements with the bulky fibrous material. These extra supplements and additives should preferably be of relatively low volume in order not to interfere with the basic function of the mixes.

The following examples are provided to further illustrate the nature, the practice and the benefits of the invention without limiting it beyond the terms of the claims which follow this specification.

jected. In general, lower rock contents are favored, especially from the point of view of die abrasion.

EXAMPLE 4

Sugar beet pulp from Delta, Colo. having a bulk density of 17.1 lbs/ft$^3$ was mixed with the additives of Example 1 to 3, in quantities sufficient to provide a level of approximately 0.15% by weight of animal fat in the pelleting mix, namely 0.316% vermiculite-animal fat mix (Verm-Fat) of Example 1, 3.016% of the grit-vermiculite-animal fat mix (Grit-Verm-Fat) of Example 2, and 2.516% of the grit-animal fat mix (Grit-Fat) of Example 3. Pelleting runs containing only animal fat (Fat) at the 0.15% level, only grits (Grits) at the 2.85% level and no additive at all (control) were made for comparison purposes.

The beet pulp, with or without additives as the case may be, was placed in a paddle mixer where it was stirred for about 22 minutes. The resulting material was then pelleted by means of a California pellet mill (model CL). The results obtained can be tabulated as follows:

|  | Pulp Density after mixing (lbs/ft$^3$) | Pellet Density (lbs/ft$^3$) | Pelleting Rate at 3.3 AMPS (lbs/min) | (% increase) |
|---|---|---|---|---|
| Control | 31.0 | 48.6 | 2.10 | — |
| Verm-Fat | 25.3 | 46.3 | 4.50 | 114% |
| Verm-Grits-Fat | 26.0 | 48.8 | 3.38 | 61% |
| Grits-Fat | 27.1 | 48.6 | 2.95 | 40% |
| Fat | 25.8 | 47.5 | 4.00 | 90% |
| Grits | 34.6 | 49.8 | 1.62 | −23% |

EXAMPLE 1

Inedible animal fat (feed grade) was heated to about 150° F and blended into No. 4 vermiculite to yield a product containing one part fat and one part vermiculite by weight. Excessive blending was avoided to prevent the disintegration of the vermiculite particles. The product was a free-flowing material having a bulk density of about 17 pounds per cubic foot and an average particle size of about 960 microns.

The vermiculite used is a grade of expanded vermiculite ore having a density of about 8.7 pounds per cubic foot and an average particle size of about 910 microns.

EXAMPLE 2

A vermiculite-animal fat mix of the type prepared in Example 1 was blended with No. 5 Verxite ore grits to yield a product containing 5% animal fat, 5% vermiculite and 90% grits. The density ranged from 51 to 58 pounds per cubic foot.

EXAMPLE 3

Inedible animal fat was heated to 100°–130° F and added to Verxite ore grits No. 5 in a paddle mixer. The resulting product containing 16 parts grits and 1 part fat had a bulk density of 80 pounds per cubic foot. The material was pelleted through a 5/32 inch die on a laboratory California pellet mill to produce ¼ inch long pellets.

The ore grits used consist of finely divided unexpanded vermiculite ore having a density of about 70 pounds per cubic foot and an average particle size of about 170 microns. These values as well as the rock content, which in the present case was about 31%, may vary to some extent depending on the origin of the ore and the treatment to which it has previously been subjected.

It becomes evident on examination of the above data that expanded vermiculite, while having little or no effect per se on pelleting rate, not only acts as an excellent carrier for animal fat, but also enhances the beneficial effect of the fat upon the process by almost 25%. The art is thus provided with a storage stable non-caking preparation which can easily be blended with a fibrous agricultural refuse material without the necessity of heating to soften or melt the animal fat component before such blending may take place.

It can also be seen that while vermiculite ore grits of high rock content (31.4% by weight) having a negative influence on the pelleting of beet pulp, its incorporation at fairly high levels into the vermiculite-fat mix just discussed results in a less effective by nevertheless useful pelleting aid which is more easily dispersible into fibrous agricultural refuse than the more sparingly used vermiculite-fat material.

EXAMPLE 5

Beet pulp from Billings, Mont., was ground through a 0.5 inch screen on a hammer mill and blended, in a blade mixer, with a 1:16 animal fat-grits mixture prepared as in Example 3. The fat used was a crude, feed grade animal fat with a melting point of about 175° F. The grits were fine, dusty and of small particle size, as was the material used in Example 3. The rock contents, however, was about 13.5% by weight with the rest being constituted by vermiculite, about 80%, and volatiles (water), about 7.5%. The material had a bulk density of 64.5 lbs/cu. ft. (vibrated).

The blend thus obtained, containing a net level of 4% and 0.25% by weight of grits and fat respectively, was, after steam conditioning, extruded through a 2 hp California pellet mill (model CL) at the rate of 191.4 lbs/horse-power hour. In contrast, an extrusion carried out under comparable conditions, but without any fat-grits additive, could only achieve a rate of 103.2 lbs/hph. An 85.5% increase in rate could thus be attributed to the additive of the invention.

EXAMPLE 6

Alfalfa, first cutting containing 26% protein, was blended in the manner and with the fat-grits additives used in Example 5. Extrusion through the same pellet mill under comparable conditions, permitted a through-put of 144.3 lbs/hph, an improvement of 83% over the pelleting rate of the same alfalfa without the additive.

Similar runs with more mature alfalfa, i.e., alfalfa containing less crude protein and more crude fiber, showed significant improvement in pelleting rate with the fat-grit additive although, as expected from general experience in alfalfa pelleting, this improvement was less pronounced than that shown for the high protein material just discussed.

EXAMPLE 7

A large scale test of the additives of the invention was conducted with the type of equipment used in the field. Wet pulp from the extraction process with 30% molasses nominal (dry basis) added was mixed and dried. The dry pulp was then taken up by a bucket elevator, a constant speed screw feeder and a pellet mill feeder to a conditioning chamber in which was also fed the pelleting additive under test at the rates mentioned in the table below. Steam and water were injected into the chamber and the resulting conditional meal was put through a 75 hp pellet mill run under maximum load condition of (80 ± 5 amps) to yield pellets of good quality, i.e., about 10% moisture, density of 35 - 40 lbs/ft$^3$ and a durability index of 90 or above (ASAE). The pellet mill, a California "Century" model converted from 50 hp to 75 hp, produced one-inch pellets of ¼ inch diameter through a 2 inches die relieved on the exterior to reduce friction within the die. The mill was operated as the limiting point in the process with all other equipment being set to deliver an excess of pulp to the mill with any overflow being recycled. The results obtained from the control run and for the various additives are shown in the next table.

satisfactory and convenient manner on a scale such as that required by field operations. Under these conditions, the advantages of the additive mixes of this invention from the point of view of storage, handling and pelleting are unquestionable.

While the examples just provided do illustrate, inter alia, what is presently considered to be the best embodiment of the invention, it should be evident to the man skilled in the art after having become acquainted with this specification, that variation can be made in the quantities and proportions of ingredients used without departing from the spirit of the invention. These variations are rendered necessary by the complex nature of the pelletable agricultural refuse products, their numerous places of origin and the time of pelleting — these factors affecting such characteristics as moisture, protein, fat, fiber, and ash content. Variations likewise occur in the fatty substance employed due to again, their place of origin, their previous history and the like. Vermiculite ore fines and expanded vermiculite also vary according to origin and method of processing. Still, in spite of these tactical possibilities, the invention disclosed is best described by the terms stated in the following claims.

What is claimed is:

1. A pelletizing aid for edible fibrous agricultural refuse material which consists essentially of an organic fatty material with an inorganic material selected from the group consisting of:
    a. mixtures of (1) an organic fatty material selected from the group consisting of animal fat, vegetable oils, hydrogenated vegetable oils and mixtures thereof and an inorganic material selected from the group consisting of finely divided unexpanded vermiculite ore and mixtures of finely divided vermiculite ore with expanded vermiculite; and
    b. mixtures of an animal fat with an inorganic material selected from the group consisting of expanded vermiculite, finely divided unexpanded vermiculite ore and mixtures thereof.

2. The pelleting aid of claim 1 wherein the proportions of the components are present in the weight ratios of about 50:50 for the fat bearing material and the expanded vermiculite respectively, and about 10:90 for the fat-bearing material and the finely divided ore.

3. The pelleting aid of claim 1 wherein the fatty material is inedible animal fat.

| PRODUCTION SCALE TEST OF PELLETING AIDS | | | | |
|---|---|---|---|---|
| | | | Expanded Vermiculite | |
| Run | Control | Grits-Fat | +Grits-Fat | +Fat |
| Additive (%) | — | 3.2 | 3.0 | 0.4 |
| Resulting fat content (%) | — | 0.188 | 0.15 | 0.20 |
| Pelleting Data | | | | |
| Pelleting Rate (lbs/hr) | 6000 | 6863 | 7867 | 6882 |
| Increase over control (%) | — | 14.4 | 31.1 | 14.7 |
| Pellet Properties | | | | |
| Water content (%) | 11.3 | 11.1 | 9.9 | 9.8 |
| Bulk density (lbs/ft$^3$) | 40.0 | 39.5 | 39.0 | 42.0 |
| Durability (ASAE) | 98.8 | 98.0 | 98.6 | 98.4 |

As can be seen from the above pelleting rates, the incorporation of animal fat on grits, on expanding vermiculite and on expanded vermiculite with grits has sensibly improved the capacity of the pelleting equipment used in production scale operations. These improvements in rates ranging from about 14 to 30% are all the more significant due to the impracticality of mixing substances such as animal fat and beet pulp in a 4. The pelleting aid of claim 1 wherein the fatty material is raw cottonseed oil.

5. A process for pelletizing edible fibrous agricultural refuse material which comprises adding to said material a quantity of the mixture of claim 1 or of a mixture of expanded vermiculite with vegetable oil, sufficient to provide a fatty material content of at least about 0.1% by weight in the pelleting mix.

6. The process of claim 5 wherein the agricultural material is sugar beet pulp.

7. The process of claim 6 wherein the pelleting aid is added in a quantity sufficient to provide a fatty material content within the range of about 0.1 to 0.3% by weight in the pelleting mix.

8. A pelleted edible fibrous agricultural refuse material comprising a quantity of pelletizing aid sufficient to provide a net fatty material content of at least 0.1% by weight, said pelletizing aid having been selected from the group comprising the mixtures described in claim 1 and mixtures of vegetable oil with expanded vermiculite.

* * * * *